United States Patent [19]
Bourgraf et al.

[11] 3,801,208
[45] Apr. 2, 1974

[54] PIVOT LOCKING MEANS
[75] Inventors: Elroy E. Bourgraf, Cincinnati;
Kenneth R. Self, Washington, both of Ohio
[73] Assignee: Ferno-Washington, Inc., Greenfield, Ohio
[22] Filed: Oct. 21, 1971
[21] Appl. No.: 191,393

Related U.S. Application Data
[62] Division of Ser. No. 52,535, July 6, 1970, Pat. No. 3,653,079.

[52] U.S. Cl. .................................. 403/95, 403/102
[51] Int. Cl. ............................................. F16c 11/10
[58] Field of Search ........... 287/99, 95, 100, 92, 98, 287/96; 16/146; 403/102, 95, 92, 79, 157

[56] References Cited
UNITED STATES PATENTS
3,653,079  4/1972  Bourgraf ....................... 287/99 X
2,748,955  6/1956  Anselmo ....................... 287/100 X
2,394,494  2/1946  Schwinn ............................ 287/99
1,639,009  8/1927  Singley ............................. 287/99
2,135,487  11/1938  Askue ........................... 287/99 X
3,514,821  6/1970  Saxmart ...................... 24/230 AV Primary Examiner—Andrew V. Kundrat
Attorney, Agent, or Firm—Melville, Strasser, Foster & Hoffman

[57]  ABSTRACT

A pivot lock for detachably and pivotally interconnecting a pair of opposing members, such as the frame parts of a break-away stretcher, said lock having opposite parts one of which is bifurcated and mounts a pivot pin, the other part being in the form of a tongue having a pin receiving slot therein together with a pin engaging latch member adapted to releasably maintain the pin in the slot.

7 Claims, 9 Drawing Figures

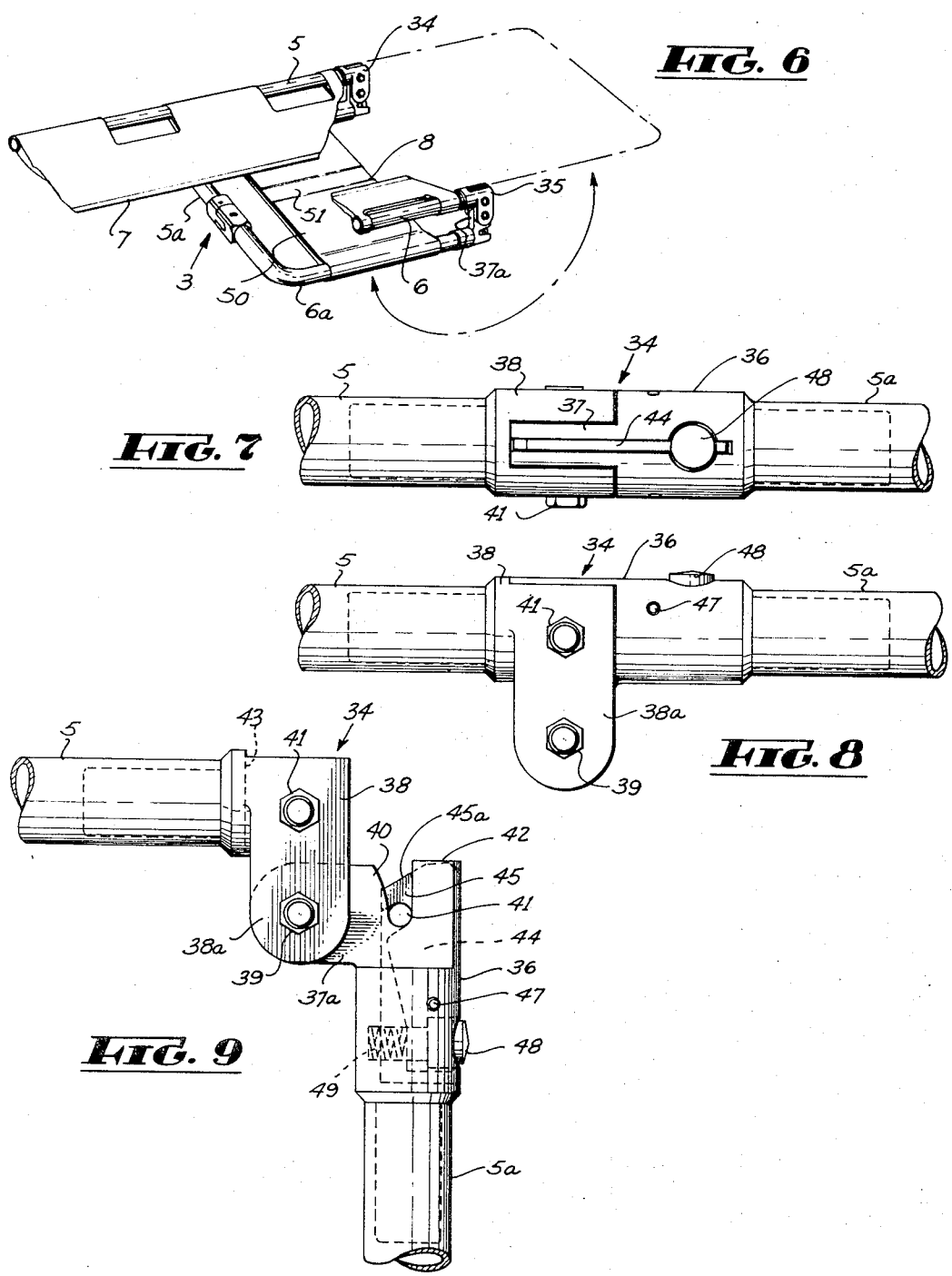

PIVOT LOCKING MEANS

BACKGROUND OF THE INVENTION

This is a division of co-pending application Ser. No. 52,535, filed July 6, 1970, now U.S. Pat. No. 3,653,079 and entitled "Adjustable Break-Away Splint-Stretcher."

The present invention relates to a releasable locking means for interconnecting a pair of opposing members, the locking means additionally permitting pivotal movement of the interconnected members relative to each other. Locking means in accordance with the present invention are particularly suited for joining together the opposing frame parts of a break-away stretcher employed to transport a critically injured person, the parts of the stretcher being separable at one or both ends so that the frame parts may be positioned beneath the injured person and joined together without having to lift the injured person onto the stretcher. Similarly, the injured person may be removed from the stretcher by separating the frame parts and withdrawing them from beneath the injured person, thereby permitting transfer from the stretcher to an operating table, hospital bed or the like without lifting or otherwise moving the injured person. While locking means of the present invention will be described in conjunction with a break-away stretcher, it will be understood that the locking means will find utility in other situations wherein it is desired to detachably and pivotally interconnect an opposing pair of frame member or the like.

Heretofore, the frame parts of a break-away stretcher have been detachably secured together by means of bolts and wing nuts, by ball screws, or by screw collars, none of which is completely satisfactory in that the parts may become accidentally disengaged and hence the connections are not fail-safe. In addition, in the case of the screw collars, the interconnected parts cannot be pivoted relative to each other and must be completely disconnected before they can be separated.

RESUME OF THE INVENTION

The present invention provides an improved pivot lock by means of which an opposing pair of frame members or the like may be releasably and reliably locked together in a fail-safe manner, and yet the parts of the lock may be readily disengaged to permit the frame members to be separated. To this end, a lock in accordance with the invention comprises a first part having a tongue adapted to be received in a bifurcated second part, the tongue having an open-ended slot therein engageable with a pivot pin extending between the bifurcations in the second part, the first part also mounting a spring biased latch member engageable about the pivot pin to lock the parts together, the latch member being recessed and provided with a finger engageable release button which must be depressed within the confines of the part to release the latch from engagement with the pivot pin to permit separation of the parts. Such arrangement provides a positive lock which cannot be accidentally released; yet the parts of the pivot lock may be readily and quickly disengaged simply by pressing the release button with a finger or thumb.

In a modification of the invention, particularly suited to rigidly interconnect an opposing pair of members and yet permit them to be pivoted relative to each other when desired, the bifurcated member is provided with an angularly related bifurcated extension and the tongue part is provided with a mating extension pivotally connected to the bifurcated extension by a pivot pin, the parts thus pivoting relative to each other about their said extensions. In this instance, the latch member which locks the parts together engages a second pin extending through the bifurcated part in a position to be received in the slot in the tongue part and engaged by the latching member. Such modified locking member may be employed in a stretcher construction provided with a foldable section to reduce its over-all length for storage purposes, or in any other application wherein it is desired to rigidly interconnect two members in prolongation of each other and yet permit such members to be folded relative to each other when desired.

DESCRIPTION OF THE DRAWINGS

FIG. 6 is a fragmentary perspective view illustrating a stretcher frame provided with a foldable head section.

FIG. 7 is a plan view of a modified pivot lock for the foldable section.

FIG. 8 is a side elevational view of the modified pivot lock.

FIG. 9 is a side elevational view with internal parts in dotted lines illustrating the pivot lock of FIGS. 7 and 8 in partially open condition.

DESCRIPTION OF THE PREFERRED EMBODIMENT

Figure 1:
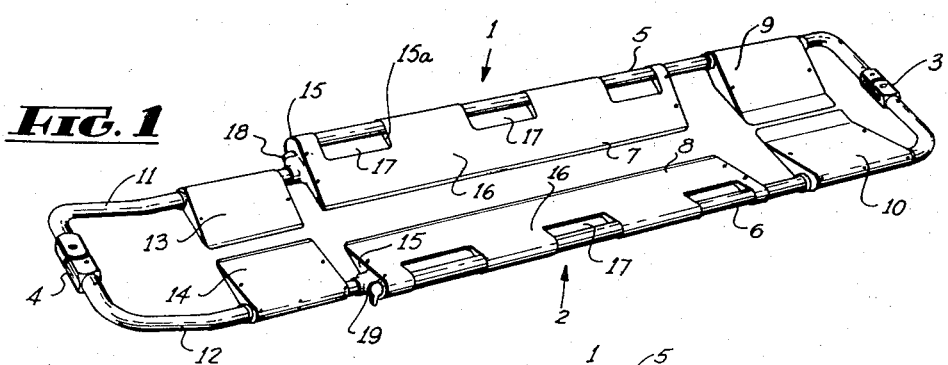
FIG. 1 is a perspective view of a break-away stretcher in assembled condition illustrating the use of pivot locking means in accordance with the invention.
Figure 2:
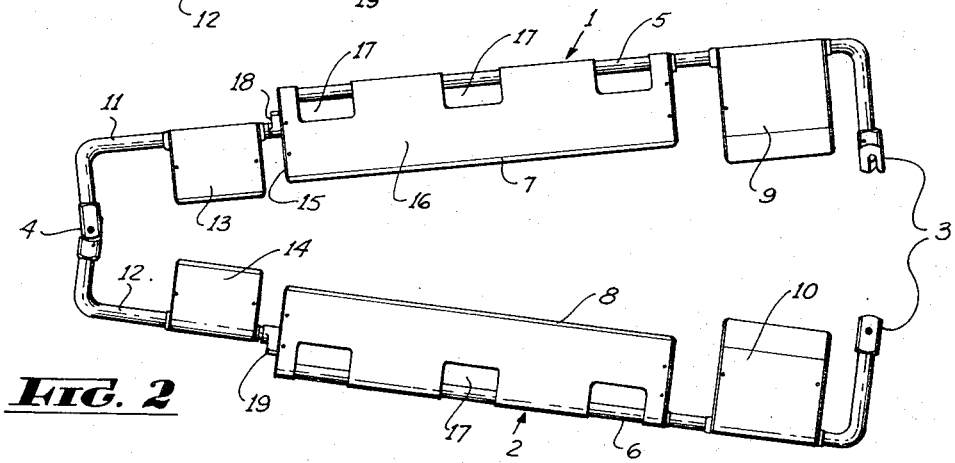
FIG. 2 is a plan view of the stretcher with the complimentary frame parts pivoted outwardly relative to each other.

Referring first to FIGS. 1 and 2 of the drawings, the invention is shown applied to a stretcher comprising complimentary frame parts indicated generally at 1 and 2, the opposite ends of the frame being interconnected by the pivot locks 3 and 4. In the stretcher illustrated the tubular frame members 5 and 6 mount body supporting panels 7 and 8, and the head supporting panels 9 and 10, respectively. Similarly, the extensible tubular members 11 and 12 mount leg supporting panels 13 and 14, respectively. The various supporting panels may be fabricated from a series of ribs, such as the ribs 15, 15a covered by a skin of aluminum sheeting 16 provided with spaced apart hand-hold openings 17. Locking fixtures 18 and 19 permit the extensible tubular members 11 and 12 to be moved outwardly or inwardly relative to the remainder of the stretcher, thereby adjusting the length of the stretcher to fit any size patient.

Figure 3:
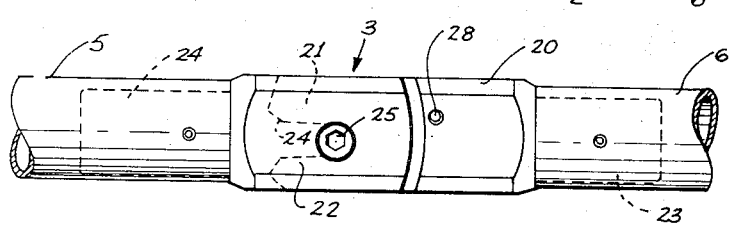
FIG. 3 is a side elevational view of the pivot lock.
Figure 4:
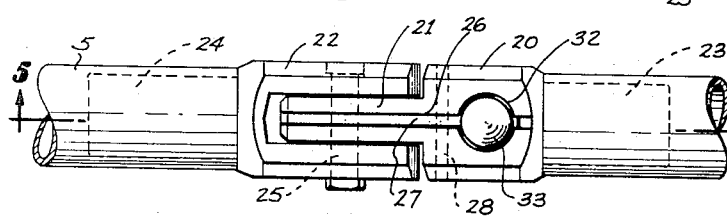
FIG. 4 is a plan view of the pivot lock illustrated in FIG. 3.
Figure 5:
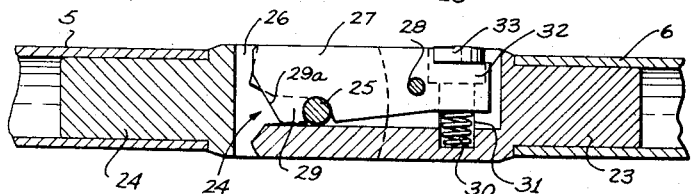
FIG. 5 is a vertical sectional view taken along the line 5—5 of FIG. 4.

FIGS. 3, 4 and 5 illustrate the construction of the pivot locks, such as the pivot lock 3, which comprises a first part 20 having a horizontally disposed tongue 21 adapted to be received in a bifurcated second part 22. The first or tongue part 20 terminates rearwardly in a plug 23 adapted to be received within and secured to the end of tubular member 6, whereas the bifurcated second part 22 terminates rearwardly in a plug 24 adapted to be secured within the end of tubular frame member 5. The tongue 21 has an open-ended slot 24 therein adapted to engage about a pivot pin 25 extending between the bifurcations of the second part 22, the closed end of the slot seating against the pin when the parts are in their fully assembled condition. The first part 20, including the horizontally disposed tongue 21, has an elongated slot 26 extending inwardly from one side thereof, preferably the inside, i.e., the side facing inwardly toward the cot frame, the slot mounting a latch member 27 pivotally connected in the slot by pin 28. The latch member has hooked end 29 adapted to engage about the pivot pin 25 when the parts 20 and 22 of the pivot lock are in the assembled position. The latch member 27 is biased into locking engagement with the pin 25 by a spring 30 received in a bore 31 underlying the elongated slot 26 adjacent the rearmost end of the latch member, the bore 31 opening upwardly in an enlarged bore 32 which receives a button 33 secured to the rearmost end of the latch member 27.

As will be evident from FIG. 5, the arrangement of the parts is such that the latch member 27 lies substantially within the confines of the slot 26, with the button 33 lying within the confines of enlarged bore 32 or with its uppermost surface projecting just slightly therebeyond. With such arrangement, a stretcher bearer may firmly grip the end of the cot without accidentally disengaging the latch member. However, if it is desired to separate the parts of the pivot lock, the bearer may do so, even while gripping the stretcher, by pressing a thumb or finger against the button 33 to urge it downwardly within the enlarged bore 32. This movement causes the latch member 27 to pivot in a clockwise direction (as seen in FIG. 5) thereby releasing the hooked end 29 of the latch member from engagement with the pin 25. The parts 20 and 22 may then be disengaged, whereupon release of the button 33 will cause the latch member to assume its closed position under the influence of spring 30. Reengagement of the parts of the pivot lock is essentially automatic in that as the parts are moved toward each other, the pivot pin 25 will contact the inclined leading edge 29a of the hooked portion 29 of the latch member, thereby causing it to pivot in a clockwise direction against the resistance of spring 31. When the hooked end 29 passes beyond the pivot pin 25, the spring will automatically return the latch member to its closed, pivot pin engaging position. Thus, the stretcher bearer has only to press the button 33 to disengage the parts of the pivot lock, and has only to snap the parts together to reengage them. It should also be apparent that when the parts are in the assembled position, they are nonetheless free to pivot in a horizontal plane; yet due to the interfitting of the tongue part and the bifurcated part, the assembly is held against relative vertical movement, thereby maintaining the tubular frame members 5 and 6 in rigid relationship insofar as relative vertical movement is concerned.

Where it is desired to reduce the over-all length of the stretcher for storage purposes, a portion of the stretcher frame may be made foldable. Thus, as illustrated in FIG. 6, the tubular frame members 5 and 6 may be severed adjacent the head ends of the body supporting panels 7 and 8 to provide foldable extensions 5a and 6a connected to the tubular frame members 5 and 6 by means of modified pivot locks or hinge locks 34 and 35, respectively, the extensions being movable from the extended position, indicated by a dotted line, to the folded position, illustrated in solid lines. The construction of the modified locks, such as the hinge lock 34, is illustrated in FIGS. 7, 8 and 9, and as in the case of the pivot locks 3 and 4, the hinge lock comprises a first part 36 having an elongated tongue 37 which, in this instance, is vertically disposed. In addition, the tongue has an angularly related extension 37a preferably extending downwardly at right angles to the tubular frame members 5 and 6. The second or bifurcated part 38 is adapted to receive the tongue 37 and is provided with a bifurcated extension 38a to receive the extension 37a of the tongue. The two parts are pivotally connected together by a pivot pin 39 extending between the bifurcated extension 38a through the tongue extension 37a.

As in the case of the pivot lock, the part 36 of the hinge lock is provided with an open-ended slot 40 adapted to engage about a locking pin 41 when the parts are pivoted to the closed position; and when in this position the end edge 42 of the part 36 will abut and seat against the surface 43 of the part 34, thereby preventing the hinge from pivoting upwardly beyond the position in which the tubular members 5 and 5a are in axial alignment. The hinge is, however, free to pivot downwardly thereby permitting the tubular members 5a and 6a to be folded beneath the frame members 5 and 6 to assume the position illustrated in full lines in FIG. 6.

To prevent accidental buckling or collapsing of the foldable head section, it is preferred to provide the part 36 with a latch member 44 of essentially identical constuction to the latch member 27 described in conjunction with the pivot lock, the latch member having a hooked end 45 engageable about the locking pin 41 when the pin is fully seated in the open-ended slot 40. The latch member 44 pivots on pin 47 and includes release button 48 and biasing spring 49.

As should be evident, the foldable frame members 5a and 6a will be normally locked in their extended position, in which they lie in prolongation of the frame members 5 and 6. The hinge locks cannot be unlocked unless a finger or thumb presses the button 48 downwardly within the confines of the part 36, whereupon the latch member is disengaged and the hinge lock is freed to pivot about pivot pin 39 in a clockwise direction. The hinge locks are self-locking when the tubular members 5a and 6a are returned to their extended position, the inclined leading edge 45a of the locking member contacting the locking pin 41 which cams the latch member in a clockwise direction against the resistance of spring 49, whereupon when the locking pin 41 is seated against the end of slot 40, the spring will cause the latch member to move in a clockwise direction with the hooked end 45 engaging about the locking pin.

Where the head end of the stretcher is foldable, the head supporting panels 9 and 10 may be replaced with a fabric support 50 (FIG. 6) to avoid interfering with the body supporting panels 7 and 8, and since the fabric support must be removed or at least loosened before the opposing parts of the stretcher can be separated, the fabric support can be conveniently formed as an essentially flat tube having a releasable closure 51, such as a strip of Velcro or similar fastening means.

As should now be eivdent, the instant invention provides pivot locks which are fail-safe in that they are positively locked together and cannot be accidentally disengaged during normal handling, the release of the latch members requiring the depression of release buttons well within the confines of the parts with which they are associated. Yet the user may readily release the latches when it is desired to disengage the parts; a stretcher bearer, for example, may readily release the latches even while gripping the stretcher.

Modifications may be made in the invention without departing from its spirit and purpose, and numerous such modifications have already been set forth and others will occur to the skilled worker in the art upon reading this specification.

The embodiments of the invention in which an exclusive property or privilege is claimed are defined as follows:

1. A pivot lock for pivotally interconnecting a pair of opposing members, said pivot lock comprising a tongue part adapted to be connected to one of said opposing members and a tongue receiving bifurcated part adapted to be connected to the other of said opposing members, said bifurcated part having a pin extending therethrough and said tongue part having an open-ended slot therein engageable with said pin, said tongue part also having an elongated slot therein lying at right angles to said open-ended slot and in communication with said open-ended slot, a latch member pivotally mounted in said elongated slot, said latch member having a hooked end engageable about said pin when seated in said open-ended slot, and spring means normally biasing the hooked end of said latch member into engagement with said pin.

2. The pivot lock claimed in claim 1 wherein said latch member mounts a release button at its end opposite said hooked end, said release button being received in a bore in said tongue part in communication with said elongated slot, said release button being depressable in said bore to pivot said latch member in a direction to release said hooked end from engagement with said pin.

3. The pivot lock claimed in claim 1 wherein the hooked end of said latch member includes an inclined outer surface contactable by said pin when said tongue part is inserted in said bifurcated part, said pin acting on said inclined surface to pivot said latch member to an open position in which said pin may pass the hook end of said latch member, whereupon said latch member will be returned to a hook engaging position by said spring means.

4. The pivot lock claimed in claim 1 wherein said tongue part has an angularly related extension, wherein said bifurcated part has an angularly related bifurcated extension adapted to receive the extension of said tongue, and wherein a pivot pin interconnects said extensions.

5. A hinge lock for hingedly connecting a pair of members for pivotal movement relative to each other and for releasably locking the members in a fixed position of use, said hinge lock comprising a tongue part and a bifurcated tongue receiving part, said parts each having an angularly related extension, a pivot pin interconnecting said extensions, said tongue part having an open-ended slot therein engageable about a locking pin extending through said bifurcated part and lying in spaced relation to said pivot pin, said tongue part including a latch member engageable with said locking pin to maintain said locking pin in said open-ended slot.

6. The locking hinge claimed in claim 5 wherein said tongue part has an elongated slot therein lying at right angles to said open-ended slot and in communication with said open-ended slot, said latch member being received in said elongated slot and pivotally mounted for movement relative to said tongue part, said latch member having a hooked end engageable about said locking pin, spring means normally biasing the hooked end of said locking member into engagement with said locking pin, said latch member mounting a release button at its end opposite said hooked end, said release button being received in a bore in said tongue part in communication with said elongated slot, said release button being depressable in said bore to pivot said latch member in a direction to release said hooked end from engagement with said locking pin.

7. The locking hinge claimed in claim 6 wherein the hooked end of said latch member includes an inclined outer surface positioned to contact said locking pin when said locking pin is inserted in said open-ended slot, said pin acting on said inclined surface to pivot said latch member to an open position in which said locking pin may pass the hooked end of said latch member, whereupon said latch member will be returned to a locking pin engaging position by said spring means.

* * * * *